United States Patent
Liang et al.

(10) Patent No.: US 9,342,461 B2
(45) Date of Patent: May 17, 2016

(54) CACHE MEMORY SYSTEM AND METHOD USING DYNAMICALLY ALLOCATED DIRTY MASK SPACE

(71) Applicant: QUALCOMM Incorporated, San Diego, CA (US)

(72) Inventors: Jian Liang, San Diego, CA (US); Chun Yu, San Diego, CA (US); Fei Xu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 13/687,761

(22) Filed: Nov. 28, 2012

(65) Prior Publication Data

US 2014/0149685 A1    May 29, 2014

(51) Int. Cl.
*G06F 12/08*    (2006.01)
*G06F 12/02*    (2006.01)

(52) U.S. Cl.
CPC ........ *G06F 12/0891* (2013.01); *G06F 12/0804* (2013.01); *G06F 12/0886* (2013.01); *G06F 12/0895* (2013.01); *G06F 2212/604* (2013.01)

(58) Field of Classification Search
CPC .......... G06F 12/0891; G06F 2212/604; G06F 2212/70; G06F 12/0817; G06F 12/0826
See application file for complete search history.

(56) References Cited

U.S. PATENT DOCUMENTS

| | | | |
|---|---|---|---|
| 5,155,824 A * | 10/1992 | Edenfield et al. | 711/143 |
| 5,802,572 A * | 9/1998 | Patel et al. | 711/143 |
| 6,205,521 B1 | 3/2001 | Schumann | |
| 7,203,798 B2 | 4/2007 | Kawamoto | |
| 7,454,575 B2 | 11/2008 | Nakanishi et al. | |
| 7,555,610 B2 | 6/2009 | Okabayashi et al. | |
| 7,917,699 B2 | 3/2011 | Kim et al. | |
| 2006/0143397 A1 | 6/2006 | O'Bleness et al. | |
| 2006/0274070 A1 | 12/2006 | Herman et al. | |
| 2008/0244185 A1 * | 10/2008 | O'Krafka et al. | 711/135 |
| 2012/0246410 A1 | 9/2012 | Xu | |

FOREIGN PATENT DOCUMENTS

| | | |
|---|---|---|
| EP | 1693760 A1 | 8/2006 |
| WO | 2010055494 A1 | 5/2010 |

OTHER PUBLICATIONS

International Search Report and Written Opinion—PCT/US2013/067111—ISA/EPO—Feb. 6, 2014, 10 pp.
Second Written Opinion from International Application No. PCT/US2013/067111, dated Nov. 5, 2014, 6 pp.

* cited by examiner

*Primary Examiner* — Sanjiv Shah
*Assistant Examiner* — Glenn Gossage
(74) *Attorney, Agent, or Firm* — Shumaker & Sieffert, P.A.

(57) ABSTRACT

A cache memory system includes a cache memory including a plurality of cache memory lines and a dirty buffer including a plurality of dirty masks. A cache controller is configured to allocate one of the dirty masks to each of the cache memory lines when a write to the respective cache memory line is not a full write to that cache memory line. Each of the dirty masks indicates dirty states of data units in one of the cache memory lines. The cache controller may include a dirty buffer index which stores an identification (ID) information that associates the dirty masks with the cache memory lines to which the dirty masks are allocated. A cache line may include a fully dirty flag indicating when each byte in that cache line is dirty, so that a dirty mask does not need to be allocated for that cache line.

25 Claims, 7 Drawing Sheets

| time | Valid 300 | Tag 302 | Data 306 | Data 308 | Data 310 | Dirty Flag 312 | Fully Dirty Flag | Dirty Buffer Index 316 |
|---|---|---|---|---|---|---|---|---|
| 0 | 0 | xxx | xx | xx | xx | x | x | xxx |
| 1 | 1 | 777 | xx | 00 | xx | 1 | 0 | 101 |
| 2 | 1 | 777 | FF | 00 | xx | 1 | 0 | 101 |
| 3 | 1 | 777 | FF | 00 | 88 | 1 | 1 | xxx |
| 4 | 1 | 723 | 11 | 22 | 33 | 0 | 0 | xxx |

FIG. 4A

| time | Dirty Mask Space 18 Address: 101 | Main Memory 16 Address: 777 |
|---|---|---|
| 0 | | |
| 1 | 010 | AA AA AA |
| 2 | 110 | AA AA AA |
| 3 | 111 | AA AA AA |
| 4 | xxx | FF 00 88 |

CACHE MEMORY SYSTEM AND METHOD USING DYNAMICALLY ALLOCATED DIRTY MASK SPACE

TECHNICAL FIELD

This disclosure relates to memory management, and more particularly, to management of cache memory.

BACKGROUND

Cache memory, also referred to as cache, is used in a variety of data processing systems to accelerate access to data. A byte-writable cache allows clients to write some bytes of a cache memory line, leaving the other bytes untouched. In writing to byte-writable cache memory, it is important to maintain data coherency. A variety of byte-writable cache memory write schemes may be used to maintain data coherency. Some of these write schemes may undermine system performance or consume excessive memory space.

SUMMARY

In an example, a dirty buffer may include a plurality of dirty masks allocated to a cache memory line when a write to the respective cache memory line is not a full write to that cache memory line. A dirty buffer may, in an example, be part of the cache memory. In other examples, it may be separate from the cache memory, for example, a separate memory device. The dirty mask indicates the dirty state of data units in a cache memory line. Each of the cache memory lines may include a location storing an identification (ID) of the dirty mask allocated to the cache memory line. For example, the ID may generally be stored in a dirty buffer index in the same cache line as flags such as a dirty flag, which may indicate that at least one byte in the cache line is dirty and/or a fully dirty flag that may indicate that every byte in the cache memory line is dirty. This may allow for accessing convenience. In other examples, however, the ID may be stored in other memory storage locations, separate from the flags in the cache lines.

In one example, the disclosure describes a cache memory system including a cache memory including a plurality of cache memory lines, a dirty buffer including a plurality of dirty masks, and a controller configured to allocate one of the dirty masks to each of the cache memory lines when a write to the respective cache memory line is not a full write to that cache memory line. Each of the dirty masks indicates dirty states of data units in one of the cache memory lines. The controller stores identification (ID) information that associates the dirty masks with the cache memory lines to which the dirty masks are allocated.

In another example, the disclosure describes a method of operating a memory system including writing data to a cache memory including a plurality of cache memory lines, allocating one of a plurality of dirty masks to each of the cache memory lines when a write to that cache memory line is not a full write to that cache memory line, wherein the dirty mask indicates a dirty state of data units in the cache memory line, and storing identification (ID) information that associates the dirty masks with the cache memory lines to which the dirty masks are allocated.

In another example, the disclosure describes a memory system including means for writing data to a cache memory including a plurality of cache memory lines, means for allocating one of a plurality of dirty masks to each of the cache memory lines when a write to that cache memory line is not a full write to that cache memory line, wherein the dirty mask indicates a dirty state of data units in the cache memory line, and means for storing identification (ID) information that associates the dirty masks with the cache memory lines to which the dirty masks are allocated.

In another example, the disclosure describes a system including a processor, a main memory coupled to the processor, a cache memory, coupled to the processor. The cache memory includes a controller, a plurality of cache memory lines, and a dirty buffer. The dirty buffer includes a dirty mask. The controller allocates one of the dirty masks to each of the cache memory lines when a write to the cache memory line is not a full write to the cache memory line. The dirty mask indicates a dirty state of data units in the cache memory line. The controller stores identification (ID) information that associates the dirty masks with the cache memory lines to which the dirty masks are allocated.

In another example, the disclosure describes a method of operating a memory system including tracking a state of a cache memory line in a cache memory using a dirty flag that indicates when a write to the cache memory line is not a full write, allocating a dirty mask to the cache memory line when a write to that cache memory line is not a full write to that particular cache memory line, and tracking identification (ID) information of the allocated dirty mask is attached to the particular cache memory line such that the dirty mask may be accessed.

In another example, the disclosure describes a cache memory system including means for tracking a state of a cache memory line in a cache memory using a dirty flag that indicates when a write to the cache memory line is not a full write, means for allocating a dirty mask to the cache memory line when a write to that cache memory line is not a full write to that particular cache memory line, and means for tracking identification (ID) information of the allocated dirty mask is attached to the particular cache memory line such that the dirty mask may be accessed.

In another example, the disclosure describes a non-transitory computer-readable medium. The computer-readable medium including instructions that when executed cause a programmable processor to track a state of a cache memory line in a cache memory using a dirty flag that indicates when a write to the cache memory line is not a full write, allocate a dirty mask to the cache memory line when a write to that cache memory line is not a full write to that particular cache memory line, and track identification (ID) information of the allocated dirty mask is attached to the particular cache memory line such that the dirty mask may be accessed.

The details of one or more examples are set forth in the accompanying drawings and the description below. Other features, objects, and advantages will be apparent from the description and drawings, and from the claims.

DETAILED DESCRIPTION

One scheme used to maintain data coherency is sometimes referred to as a "read-allocate-write" scheme. On receiving write requests, a processor may read the target cache memory line from system memory first, and then the processor may write the selected data units, e.g., bytes to the cache memory. The un-written data units have the same value as system memory. When a line of cache memory is evicted from the cache, the entire cache memory line is sent out to system memory. Any untouched data units may be written with the same values. With this scheme, any write to a cache memory line results in a read to system memory. This leads to extra traffic to system memory and undesirable latency for write requests. In modern digital systems, memory bandwidth may generally be a bottleneck for system performance. This may be especially true for graphics processing units (GPUs). Accordingly, this scheme may not be preferable due to increased traffic to the system memory.

Another scheme used to maintain data coherency involves storing a so-called "byte dirty mask." (The data units may generally be accessible one byte at a time.) The byte dirty mask indicates any bytes in a cache memory line that are dirty. A byte is dirty when it includes data that is different from a higher-level memory, e.g., system memory, and has not yet been written to the higher-level memory, such that there may be inconsistent data in the cache and the system memory. A byte dirty mask may be used to indicate whether a modification to a cache memory line has occurred, e.g., such that the change needs to be written to system memory. Accordingly, in a write-back cache, a bit in the byte dirty mask may indicate when it is necessary to write a cache memory line back to the next higher memory level in the memory system hierarchy, e.g., system memory.

Instead of using a 1-bit dirty bit for a whole cache memory line, a 1-bit/byte dirty mask can be stored for each cache memory line. When evicted, the dirty mask may be sent out together with the cache memory line data as byte write enable data so that dirty bytes that include data that is different from the corresponding data in the higher-level memory may be determined. "Un-dirty" bytes, i.e., bytes that have not been written to and are still the same as corresponding data in the higher-level memory, may not be written to system memory. With this type of scheme, a system stores the mask together with data in each cache memory line. With a 1-bit mask for every byte, the mask Random Access Memory (RAM) is ⅛ of the data RAM, presenting a big memory area cost. Because of the RAM architecture, the mask RAM area may generally be larger than ⅛th the overall area of the RAM. As an illustration, in one example, while a cache is 8 Kilobytes (KBs) using a 512×128-bit RAM, the area is about 0.061 mm² in 28 nm technology. However, in this example, the mask RAM of 256×32-bit has an area of 0.013 mm², which is 21% of the area of the cache memory.

An example architecture for the storage of a dirty byte mask system described above is illustrated in Table 1. In one example, assume a cache has 128 cache memory lines (0 . . . 127) with 1 Kbyte data in each line. When storing the byte dirty mask using the architecture of Table 1 below, each cache memory line requires a 1024-bit DirtyByteMask, which costs 128K-bit registers, as shown in Table 1 below.

As illustrated in Table 1, cache memory lines may include a valid flag to indicate if the data in the cache memory line is valid and a tag that indicates the address in main memory that corresponds to that data in the cache. Data (not shown in Table 1) is also part of the cache memory line. A dirty flag is used to indicate if any bytes in the data of the cache memory line have been written to such that they no longer match the data in the main system memory. The cache memory line may also include a dirty byte mask that indicates which bytes of the cache memory line are dirty.

TABLE 1

Tag Architecture for a Byte Dirty Mask

| CacheLineValid | Address | CacheLine was written | Indicate which byte is dirty |
|---|---|---|---|
| Valid 0 | Tag 0 | Dirty | Dirty Byte Mask 0 [1023:0] |
| Valid 1 | Tag 1 | Dirty | Dirty Byte Mask 1 [1023:0] |
| Valid 2 | Tag 2 | Dirty | Dirty Byte Mask 2 [1023:0] |
| . . . | . . . | | . . . |
| . . . | . . . | | . . . |
| . . . | . . . | | |
| Valid 127 | Tag 127 | Dirty | Dirty Byte Mask 127 [1023:0] |

Both the read-allocate-write scheme and the store a byte dirty mask scheme described above have their own disadvantages. The read-allocate-write scheme takes extra bandwidth and storing a byte dirty mask results in an area penalty. In the example illustrated in Table 1, the byte dirty mask stores one bit for every byte in the cache memory line. If a particular bit is active, e.g., logical "1," then the corresponding byte is dirty. Other configurations are also possible.

In the second architecture discussed above, the cache memory stores a byte dirty mask. Each cache memory line in that system has a dedicated location for the byte dirty mask. Only the write requests not covering the whole cache memory line would use the dirty mask. The read requests would not use any dirty mask, and write requests covering an entire cache line can use a 1-bit dirty flag. Accordingly, having each cache memory line in a system have a dedicated location for a byte dirty mask may use more memory than necessary.

In accordance with the techniques of this disclosure, instead of using a 1-bit mask for every byte in every cache memory line, a 1-bit flag may be used for each cache memory line in conjunction with a pool of byte dirty masks. Thus, the write requests that cover the whole cache memory line may use a 1-bit dirty flag to describe the state of the cache memory. Accordingly, the 1-bit flag for an entire cache memory line may be used in place of a 1-bit mask for each byte. For each cache memory line that is dirty but not fully dirty, a pointer may be provided that points to one of the byte dirty mask memory locations. In an example, each mask in the pool of byte dirty masks may store one bit for every byte in the cache memory line. If a particular bit is active, e.g., logical "1," then the corresponding byte is dirty. Other configurations are also possible.

For example, the pointer may be used to point to a separate byte dirty mask memory location. The separate byte dirty mask memory location may be used to store byte dirty masks. Each byte dirty mask indicates which bytes of a particular cache memory line are dirty. In other words, dirty bytes are those bytes in a cache memory line that have been written such that they no longer contain the same data as a corresponding memory location in the main memory. The number of byte dirty mask memory locations may be less than the number of cache memory lines because generally, not all cache memory lines in a cache memory will have bytes that are dirty at the same time. Accordingly, less memory may be used in such an example system.

Generally, in applications utilizing a graphics processing unit (GPU), as an example, most of the requests are read requests. Read requests will not cause bytes in a cache memory line to become dirty because such reads do not change the values in the cache memory line. In other words, if, before a read, a cache memory line contains the same data as a corresponding higher-level memory, e.g., main memory, then the cache memory line will also contain the same data as the corresponding higher-level memory after the read. Additionally, most write requests have continuous addresses. Accordingly, generally, in applications utilizing a GPU, the neighboring write requests will eventually cover the whole cache memory line. Assuming that data is not overwritten with the same data, if an entire cache memory line has been written then the contents of each byte are dirty. In other words, when each byte of the cache memory line does not contain the same data as the corresponding higher-level memory locations, then it is no longer necessary to track which bytes are dirty because all the bytes are dirty. In accordance with the techniques of this disclosure, the dirty mask can be replaced by a 1-bit dirty flag and a pointer to a separate byte dirty mask memory location, which may be part of a pool of dirty masks. The 1-bit dirty flag indicates whether the cache line is dirty and, if so, the separate byte dirty mask memory location identified by the pointer indicates which bytes of the cache line are dirty. A smaller number of dirty masks may be used because every cache memory line does not need an individual dirty mask. That is, some of the cache memory lines are not dirty, i.e., do not include any dirty bytes.

This disclosure proposes a write architecture for byte-writable cache. The proposed architecture may have particular features. As one example, instead of using a dedicated dirty mask for each cache memory line, the whole cache may share a pool of dirty masks. The shared pool of dirty masks may use less memory when compared to a system that includes a byte dirty mask with each cache memory line. One aspect of system operation that may allow for the use of a smaller number of dirty masks than the number of cache memory lines is the frequency of read operations. Read operations do not change cache memory and accordingly, do not result in using a dirty mask from the pool of dirty masks. Accordingly, the number of dirty masks may be significantly smaller than the number for cache memory lines, because, as discussed above, some systems may perform large numbers of reads, which do not cause data to become dirty. Because much of the data may not become dirty, for example, at the same time as other cache memory lines, a pool of byte dirty masks may be used instead of a byte dirty masks for every cache memory line. In addition, in some systems, writes tend to be to the same cache memory lines, which means that these lines will tend to become "fully dirty." Fully dirty cache memory lines do not use a byte dirty mask, because every byte is dirty.

In an example illustrating that the number of dirty masks may be significantly smaller than the number for cache memory lines, a cache with 1000 cache memory lines may use only 20 dirty masks. If a write request does not write to a full cache memory line, such that only a subset of the bytes are dirty, a dirty mask space may be allocated to that particular cache memory line. An identification (ID) of the allocated dirty mask space may be attached to this cache memory line, so that the mask can be accessed when this cache memory line is evicted. The ID may generally be stored together with cache line flags such as a dirty flag, which may indicate that at least one byte in the cache line is dirty and/or a fully dirty flag that may indicate that every byte in the cache memory line is dirty. This may allow for accessing convenience. In other examples, however, the ID may be stored in other memory storage locations.

A cache memory line may be evicted in the sense that information about a particular cache memory line is no longer stored in a dirty byte mask. This may happen, for example, when a cache memory line is written with new information from main memory such that it is no longer dirty or when a cache memory line becomes fully dirty and there is no need to track which bytes are dirty because each byte is dirty. In some cases, if every dirty byte mask in a system is in use it may be necessary to evict a cache memory line even if it is dirty, but not fully dirty. Accordingly, the system may write the cache memory line out to main memory so that that cache memory line is no longer dirty.

Second, any write requests that hit the cache memory lines attached with a dirty mask (e.g., cache memory lines that are in use with respect to a particular dirty mask) should cause an update to the corresponding dirty mask. When the dirty mask is updated, detection logic may detect if the dirty mask is all 1's. Once the dirty mask is all 1's, indicating a cache line is fully dirty, it can be de-attached from the cache memory line by setting an ID of the dirty masks to invalid. This indicates that the cache memory line is "fully dirty." A cache memory line is fully dirty when the entire cache memory line needs to be written to the next highest memory in the memory hierarchy. In other words, a cache memory line is fully dirty when the entire cache memory line has been written such that the next highest memory such as, e.g., the main system memory or some other intermediate memory, in the memory hierarchy is not up to date.

Each cache memory line may use a 1-bit "fully dirty" flag to indicate if a particular cache memory line is fully dirty. Accordingly, for a fully dirty cache memory line, its dirty mask can be available for other requests. For example, a dirty mask for a fully dirty cache memory line may be available for re-allocation to indicate another cache memory line that is not fully written (e.g., fully dirty). The fully dirty status of the cache memory line may be indicated by the Full flag, mentioned above. As such, the dirty mask is no longer needed for that cache memory line because, for a fully dirty cache memory line, every byte in that cache memory line is dirty. Accordingly, in this example, a mask is not necessary to keep track of the bytes that are dirty.

For comparison between other uses of byte dirty mask and an example of the some of the proposed techniques of this disclosure, assume a cache memory has 128 cache memory lines with 1 Kbyte data each. When storing the byte dirty mask using other techniques, each cache memory line requires a 1024-bit DirtyByteMask, which costs 128K-bit registers, as shown in Table 1 above.

With the techniques proposed in this disclosure, in one example, each cache memory line may use a 1-bit "fully dirty" flag to indicate if a particular cache memory line is fully dirty. If the particular cache memory line is not fully dirty, a 3-bit index (referred to as the 3-bit DirtyBufferindex in Table 2 below) will indicate which buffer is storing the dirty byte mask (DirtyByteMask) for a particular cache memory line. Assuming most of the cache memory lines are either non-dirty or fully dirty, an 8-entry buffer (DirtyBuffer) may be large enough for use with a cache having 128 cache memory lines.

Each entry in the buffer may store a 1 k-bit flag and an 8-entry DirtyBuffer, which may comprise 8 k-bit registers. In one example, four extra bits for each cache memory line in the Tag are used, as illustrated in Table 2. The total bit cost of 128 cache memory lines is 4*128=512 bits. Combined with the 8 k-bit DirtyBuffer, the total number of bits used for tracking data coherency, i.e., tracking which bytes are dirty and which bytes are not dirty is 8.5 k-bits, which is much smaller than the 128 k-bit needed for storing a byte dirty mask in the other schemes mentioned above. The cache memory lines illustrated in Table 2 also includes tags that indicate addresses in main memory (or in some higher level memory) that contain data that corresponds to that data in the cache memory. For example, a tag may indicate an address in the main memory where the data stored on a particular cache line is also available to be read by a processor.

TABLE 2

Tag Architecture of one Proposed Approach

| CacheLineValid | Address | CacheLine was written | Whole cache memory line is dirty | Where the ByteDirtyMask is stored (Indicates which byte is dirty) |
|---|---|---|---|---|
| Valid 0 | Tag 0 | Dirty | Full | Dirty Buffer Index[2:0] |
| Valid 1 | Tag 1 | Dirty | Full | Dirty Buffer Index[2:0] |
| Valid 2 | Tag 2 | Dirty | Full | Dirty Buffer Index[2:0] |
| ... | ... | ... | ... | ... |
| ... | ... | ... | ... | ... |
| ... | ... | ... | ... | ... |
| Valid 127 | Tag 127 | Dirty | Full | Dirty Buffer Index[2:0] |

Figure 1:
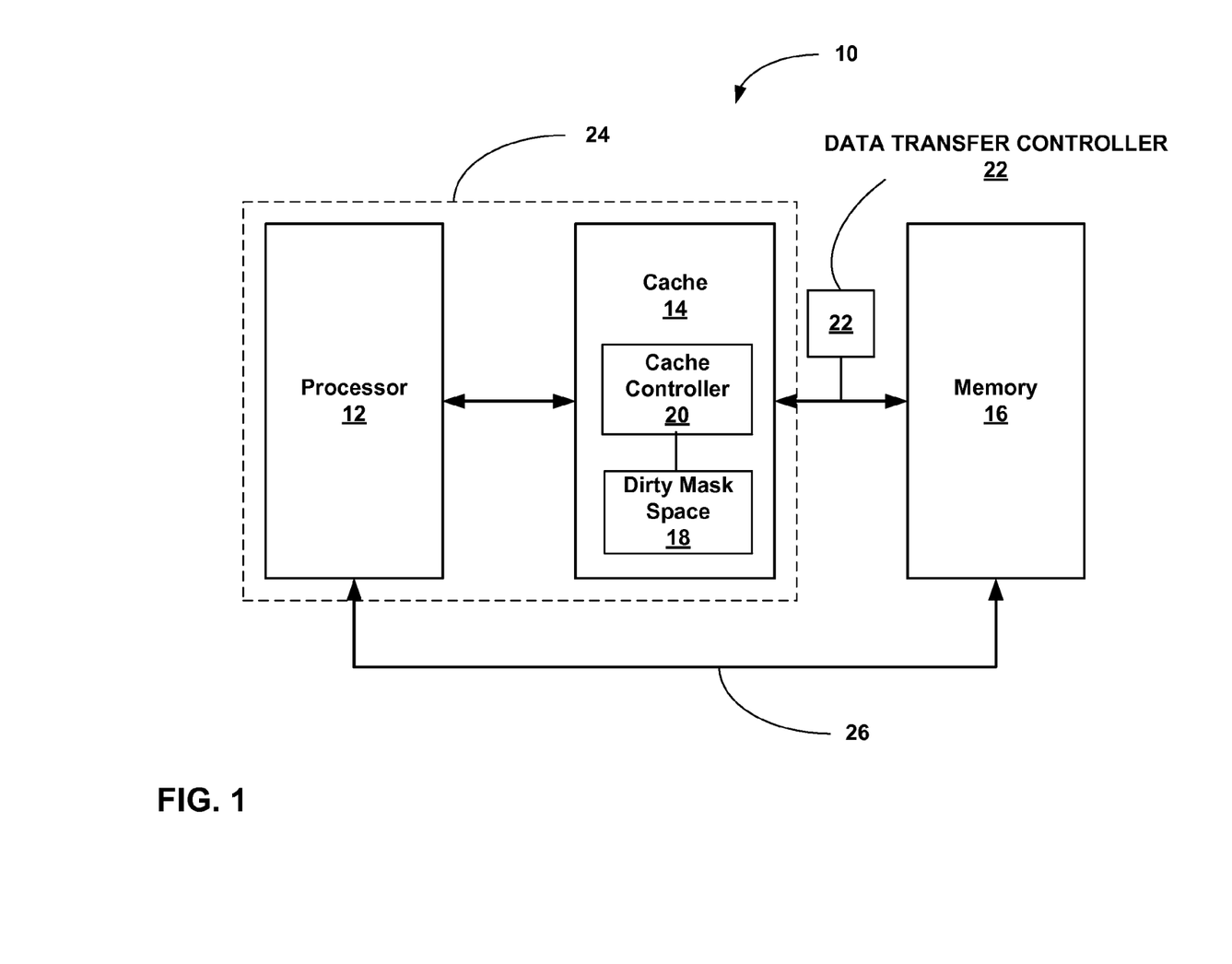
FIG. 1 is a block diagram illustrating an example processing system including a processor, a cache memory, and a main memory that may implement the techniques of this disclosure.

FIG. 1 is a block diagram illustrating an example processing system 10 including a processor 12, a cache memory 14, and a main memory 16. Processor 12 may be a microprocessor, digital signal processor (DSP), central processing unit (CPU), graphics processing unit (GPU), or other processor. Additionally, processor 12 may include digital logic, such as field programmable gate array (FPGA), complex programmable logic device (CPLD) and other digital logic implementing processing functionality. Processor 12 may include one or more combinations of these. For example, processor 12 may include a GPU as well as other logic providing processing functionality. In some examples, processor 12 may be one or multiple processors, such as multiple CPUs, multiple DSPs, a combination of one or more CPUs and DSPs, or other combinations of CPUs, DSPs, GPUs, FPGAs, CPLDs, or other processing logic.

Processor 12 may use cache memory 14 for temporary data reads and writes to reduce the average memory access time that otherwise would be necessary to access main memory 16, which may be a main system memory. The cache memory 14 may be a smaller, e.g., have a lower amount of data storage, when compared to main memory 16. Cache memory 14 may also be faster memory when compared to main memory 16. For example, a read from cache memory 14 may take fewer clock cycles to complete than a read from main memory 16. In some examples, cache memory may be on the same chip as processor 12, as indicated by dashed line 24. In other examples, cache memory may be in a separate chip, which may be adjacent to processor 12. In some examples, cache memory 14 may serve multiple processors. Cache memory 14 may also include multiple hierarchical levels, such as both a level 1 and level 2 cache. In cache memory design, there may generally be a tradeoff between latency and hit rate. Larger caches may have better hit rates but longer latency. To address this tradeoff, many systems may use multiple levels of cache, with small fast caches backed up by larger slower caches. Multi-level caches may generally operate by checking the generally smallest level 1 (L1) cache first. If the level 1 cache has a hit, the processor proceeds. If the smaller cache misses, the generally next larger cache (L2) may be checked. This may continue with higher and higher levels of cache until main memory 16 may be checked.

Additionally, cache memory 14 may store copies of data from frequently used storage locations of main memory 16. As long as most memory accesses are cached in cache memory 14, the average latency of memory accesses may be closer to the latency of cache memory 14 than to the latency of main memory 16. It will be understood that the higher percentage of cache memory 14 reads or writes that occur compared to main memory reads and writes, the higher the memory access performance of a system using the cache memory 14 and main memory 16 will generally be.

Main memory 16 may generally be random access memory (RAM) or other types of volatile computer memory. In some examples, main memory 16 may be a mix of both RAM and Read Only Memory (ROM). In some cases main memory 16 may be non-volatile memory (e.g. ROM), for example, if executable code needs to be stored, but little or no data needs to be stored. In cases where a minimal amount of data needs to be stored, a separate memory may be used, registers may be used, cache memory 14 may be used, or other types of storage may be used. In various examples, main memory 16 may be coupled to processor 12, e.g., via system bus 26. Main memory 16 will generally be considered a higher-level memory than cache memory 14. Generally, main memory 16 may be larger, e.g., have a larger amount of data storage, when compared to cache memory 14. Additionally, generally, main memory 16 will be slower when compared to cache memory 14. For example, it may take longer for processor 12 to read or write data to main memory 16 than it takes to read or write data to cache memory 14.

In the illustrated example, processor 12 is coupled to cache memory 14 to allow for reads and writes by processor 12 to cache memory 14. Additionally, processor 12 is coupled to main memory 16 to allow for reads and writes by processor 12 to main memory 16. The techniques described herein may be applied to memory configurations in which the cache memory 14 and the main memory are only coupled through processor 12. Additionally, in the illustrated example, main memory 16 may be coupled to cache memory 14 to allow for transferring data between the main memory 16 and cache memory 14 without intervention by processor 12. For example, a data transfer controller 22 may control this data transferring. As illustrated, data transfer controller 22 may be external to main memory 16 and cache memory 14. In other examples, data transfer controller 22 may be part of main memory 16 or cache memory 14. Data transfer controller 22 may also include components in main memory 16 and cache memory 14 or components in main memory 16, cache memory 14, and external to these devices. In some examples, cache controller 20 and data transfer controller 22 may be a single controller. It will be understood that other memory configurations are also possible. For example, a cache may be connected to a main memory but not a processor or the cache may be connected to the processor and not main memory. In another example, systems with multiple higher levels of memories may be used in conjunction with the techniques described herein. For example, some systems may have a first level cache that is on the same chip as processor 12 and a second level cache (not shown) that is off chip from processor 12, as well as main memory 16. Generally any cache memory, e.g., first level cache, optional second level cache, etc. will be separate memory devices from main memory 16 and will not generally be on the same chip as main memory 16.

In an example, cache memory 14 is a byte writable cache that includes various aspects for tracking which, if any, bytes processor 12 has and has not written data to. Cache memory 14 does not use a dedicated mask for each cache memory line. Rather, in one example, in cache memory 14, the whole cache shares a pool of dirty masks in dirty mask space 18. The pool of dirty byte masks or flags are allocatable to different lines of cache memory 14 as needed. Generally, such a cache architecture might use less memory locations, less power, and less area than a cache system that includes a dirty mask for each cache memory lines. By sharing a pool of dirty lines, fewer total memory locations might be used.

As illustrated in FIG. 1, the pool of dirty masks in dirty mask space 18 may be stored in a portion of cache memory 14. Accordingly, the pool of dirty masks in dirty mask space 18 might be part of the same physical part as cache memory 14. In other examples, however, the pool of dirty masks in dirty mask space 18 may be stored in a separate memory or separate physical part from the cache memory. This separate memory location may be coupled to cache memory 14 to allow for performance of the techniques of the instant application. As discussed above, the number of dirty masks may be smaller than the number of cache memory lines in cache memory 14. For example, a cache memory 14 with 1000 cache memory lines might use only 20 dirty masks.

The dirty masks in dirty mask space 18 indicate when a byte is "dirty." A byte is dirty when it has been written with a value after the last system memory transfer. The value written will generally be different from the corresponding value in main memory 16. In other words, a byte is dirty when a value has been written such that the value stored in that byte is likely not the same as the value stored in the corresponding memory location in main memory 16. Conversely, a byte is not dirty when the value stored in that byte matches the value stored in the corresponding memory location in main memory 16, i.e., when we know that it has not been written since the last system memory transfer. It will be understood that various example systems do not keep track of whether a particular byte in cache memory is storing a value that is different from a corresponding value stored in main memory 16. Rather, if a write to that byte in cache memory occurs after the last system memory transfer, it may be assumed that the value no longer matches what is stored in the corresponding memory location of main memory 16. Generally, when particular bytes of a cache memory line are dirty, but not every byte of that cache memory line is dirty, the dirty mask in dirty mask space 18 allows the system to differentiate between the bytes that are dirty and the bytes that are not dirty. If none of the bytes in a particular cache memory line is dirty, then the dirty mask is not needed for that cache memory line, at least not at that particular time. At some other time, one or more bytes of that cache memory line might be dirty. Accordingly, the dirty mask in dirty mask space 18 may be used at that time. On the other hand, when all bytes of a particular cache memory line are dirty, then the dirty mask is also not needed for that cache memory line. Again, this may be true for at least that particular time. Additionally, it is not necessary to track which particular bytes are dirty because a fully dirty flag may already indicate that each byte in the cache memory line is dirty. This aspect is described in detail with respect to the examples of FIGS. 4A and 4B discussed below.

In some examples, cache memory 14 and dirty mask space 18 may be controlled by a cache controller 20. Cache controller 20 may be configured to allocate one of the dirty masks to each of the cache memory lines when a write to the respective cache memory line is not a full write to that cache memory line. In an example, each of the dirty masks indicates dirty states of data units in one of the cache memory lines. Additionally, the cache controller 20 may store identification (ID) information that associates the dirty masks with the cache memory lines to which the dirty masks are allocated.

Cache controller 20 may be a digital logic circuit, processor, or other circuitry that may implement various aspects of this disclosure. Cache controller 20 may include hardware, software, or some combination of hardware and software. Additionally, while cache controller 20 is illustrated as being internal to cache 14, in other examples, all or a portion of cache controller 20 may be separate from cache memory 14. In other examples, processor 12 might be used to control functionality of cache memory 14 to implement the control functionality.

Devices, systems, and methods implementing aspects of this disclosure may also track if a series of bytes are "fully dirty." The bytes in a cache memory 14 are fully dirty when each individual byte in that location is dirty. If each individual byte in a cache memory location is dirty (the location is fully dirty), then there is no need to use a dirty mask in dirty mask space 18 for that location to keep track of which individual bytes are dirty. This is also described in greater detail with respect to the examples of FIGS. 4A and 4B discussed below.

The system illustrated in FIG. 1 may be configured to implement a memory system that includes cache memory 14 including a series of cache memory lines. Each cache memory line may include a fully dirty flag and a dirty buffer index. Processing system 10, including a cache memory system may also include a dirty buffer including a dirty mask space. The dirty mask space may be allocated to a particular cache memory line when a write to that cache memory line is not a full write to that particular cache memory line, wherein an identification (ID) of the allocated dirty mask space is attached to the particular cache memory line such that the dirty mask space may be accessed.

Figure 2:
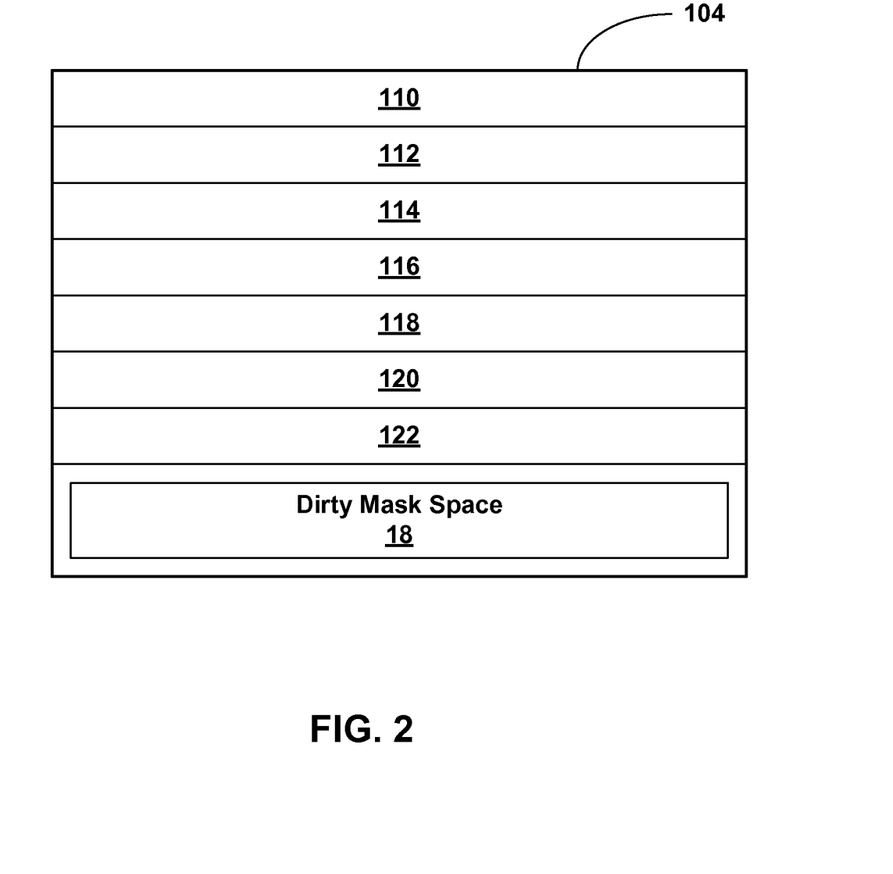
FIG. 2 is a block diagram illustrating additional details of the example cache memory of FIG. 1 that may implement the techniques of this disclosure.

FIG. 2 is a block diagram illustrating the example cache memory 14 of FIG. 1 that may implement the techniques of this disclosure. Cache memory 14 may include a number of cache memory lines 110, 112, 114, 116, 118, 120, 122 for storing data and various other information related to that data. For example, cache memory lines 110, 112, 114, 116, 118, 120, 122 may include a flag to indicate if the data in the cache memory line is valid. Cache memory lines 110, 112, 114, 116, 118, 120, 122 may also include a tag that indicates the address in main memory that corresponds to that data in the cache. It will be understood that the small number of cache memory lines 110, 112, 114, 116, 118, 120, 122 are shown for illustration and there will normally be a very large number of cache memory lines. A dirty flag may be included with each of cache memory lines 110, 112, 114, 116, 118, 120, 122 to indicate if any bytes in the data have been written to such that they no longer match the data in main memory 16.

Additionally, a fully dirty flag may be included with cache memory lines 110, 112, 114, 116, 118, 120, 122 to indicate if every byte in one of the cache memory lines 110, 112, 114, 116, 118, 120, 122 is dirty. This may occur, for example, when processor 12 has written to all of the bytes in a cache memory line and all of the bytes in the cache memory line contain different values from the data values in the corresponding memory locations in main memory 16.

Cache memory lines 110, 112, 114, 116, 118, 120, 122 may also include a dirty buffer index that acts as a pointer to a location in the dirty mask in dirty mask space 18 when a cache memory line 110, 112, 114, 116, 118, 120, 122 is dirty but not fully dirty. When a cache memory line is fully dirty, it is not necessary to use a series of flags or a mask to track which bytes are dirty. This is because all the bytes are dirty. Accordingly, when a cache memory line 110, 112, 114, 116, 118, 120, 122 is fully dirty, any location corresponding to that cache memory line 110, 112, 114, 116, 118, 120, 122 that is stored in dirty mask space 18 may be allocated to another cache memory line 110, 112, 114, 116, 118, 120, 122. Thus, portions of dirty mask space 18 may be dynamically allocated to cache memory lines 110, 112, 114, 116, 118, 120, 122 that are dirty, but not fully dirty. Additionally, dirty mask space 18 may be dynamically de-allocated from any cache memory lines 110, 112, 114, 116, 118, 120, 122 that are either fully dirty or not dirty at all. In other words, information about the cache memory line may be "evicted" from dirty mask space 18 when the data in that particular cache memory line is either fully dirty or not dirty. After the cache memory line is evicted the space used by this information can be reallocated for another cache memory line.

In yet other cases, dirty mask space 18 may have never been dynamically allocated to one or more of cache memory lines 110, 112, 114, 116, 118, 120, 122 if, for example, the one or more cache memory lines 110, 112, 114, 116, 118, 120, 122 is not dirty and was never dirty. Alternatively, the one or more cache memory lines 110, 112, 114, 116, 118, 120, 122 might be fully dirty and may have never been dirty. This might occur, for example, when an entire cache memory line, e.g., each byte in the cache memory line, is written at one time such that that cache memory line goes from not being dirty to being fully dirty in one write to the cache memory line.

The cache memory 14 illustrated in FIG. 2 may be configured to implement a memory system. Cache memory 14 may include a series of cache memory lines. Each cache memory line may include a fully dirty flag and a dirty buffer index. Additionally, cache memory 14 may also include a dirty buffer including a dirty mask space. In other examples, the dirty buffer may be external from the cache memory 14. The dirty mask space may be allocated to a particular cache memory line when a write to that cache memory line is not a full write to that particular cache memory line, wherein an identification (ID) of the allocated dirty mask space is attached to the particular cache memory line such that the dirty mask space may be accessed.

Figure 3:
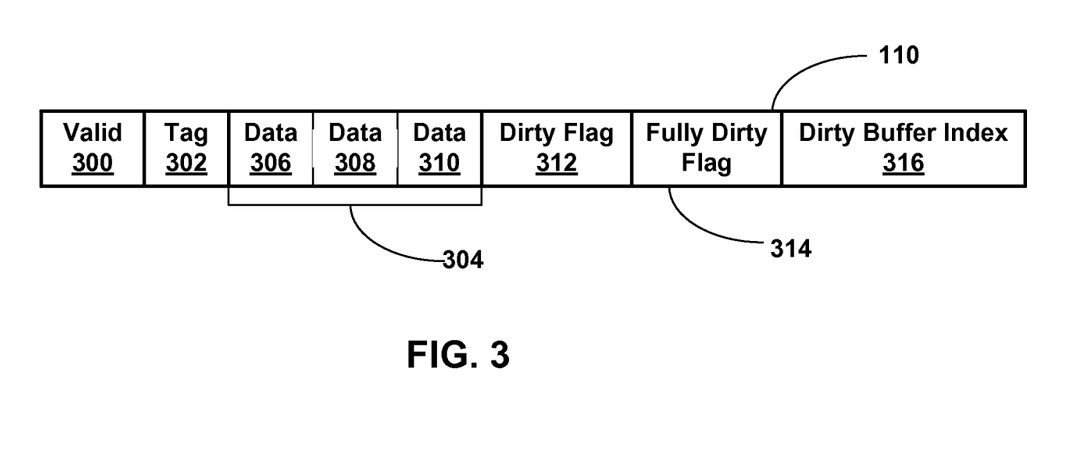
FIG. 3 is a block diagram illustrating an example of a cache memory line that may implement the techniques of this disclosure.

FIG. 3 is a block diagram illustrating the example cache memory line 110, which is one of cache memory lines 110, 112, 114, 116, 118, 120, 122 of FIG. 2 that may implement the techniques of this disclosure. Cache memory line 110 includes a valid flag 300 to indicate if the data in the cache memory line is valid. Cache memory line 110 also includes a tag 302 that indicates the address in main memory 16 that contains data that corresponds to that data in the cache memory 14, i.e., the main memory 16 data that is also available to the processor 12 in the cache memory 14. Data 304 is also part of cache memory line 110 and may include, for example, three data bytes 306, 308, 310 of data 304. In other examples, more or fewer bytes are also possible.

In the illustrated example, a dirty flag 312 may be used to indicate if any bytes in the data have been written to such that they may no longer match the data in main memory 16, e.g., if processor 12 has written new values to cache memory line 110. It will be understood that processor 12 might write the same data value to a cache memory line as the data values that are already present, but generally, the values will not be the same. Additionally, generally systems implementing these techniques might not actually check to see if values have changed. Rather, states such as "dirty" or "fully dirty" may be assumed when various writes occur. Whenever the values stored in one or more bytes of a cache memory line change and these values are no longer the same as the values stored in the corresponding location or locations in main memory 16, then the changed bytes are "dirty." When some, but not all of the bytes in a cache memory line are dirty, the system may track which bytes are dirty using a mask to indicate the particular bytes that are dirty. The mask may be stored in one of a pool of memory locations in dirty mask space 18.

A fully dirty flag 314 may be included to indicate if every byte in the cache memory line 110 is dirty. In this case, if cache memory line 110 if fully dirty, there is no need to have a dirty buffer mask in dirty mask space 18. Cache memory line 110 may also include a dirty buffer index 316 that acts as a pointer to a location in dirty mask space 18 when the cache memory line 110 is dirty but not fully dirty.

As illustrated in FIG. 3, in some examples, dirty flag 312 and fully dirty flag 314 may be used to indicate the state of each cache memory line 110. In other examples, a "clean" flag indicating that a cache memory line is not dirty and a fully dirty flag might be used. Generally, the clean flag might be the inverse of the dirty flag 312. Other examples might include a clean flag, a dirty flag, and a fully dirty flag.

It will be understood that, when the cache memory line 110 is fully dirty, it is not necessary to use a series of flags or a mask to track which bytes are dirty. This is because all the bytes are dirty. When all the bytes are dirty, a single "fully dirty" flag provides enough information to determine which bytes are dirty. Any mask indicating which bytes are dirty that is stored in dirty mask space 18 may be used by another cache memory line. Accordingly, when a cache memory line 110 is fully dirty, any location corresponding to that cache memory line 110 that is stored in dirty mask space 18 may be allocated to another cache memory line to indicate dirty bytes. Thus, dirty mask space 18 may be dynamically allocated to cache memory lines 110, 112, 114, 116, 118, 120, 122 that are dirty, but not fully dirty. Dirty mask space 18 may be dynamically de-allocated from any cache memory lines 110, 112, 114, 116, 118, 120, 122 that are fully dirty or not dirty at all.

For example, any write requests that hit the cache memory lines 110, 112, 114, 116, 118, 120, 122 attached with a dirty mask stored in cache memory line may cause an update to the corresponding dirty mask. When the dirty mask is updated, detection logic may detect if the dirty mask is all 1's, i.e., there is a "1" for every byte in the cache memory line. Once the dirty mask is all 1's, the cache memory line is fully dirty. Accordingly, the dirty mask may be de-attached from the cache memory line 110 by setting the fully dirty flag 314 to indicate that the cache memory line is "fully dirty." A cache memory line is fully dirty when each byte in the cache memory line has been written such that each byte does not include the same data as the corresponding bytes in the main memory. At this point, the entire cache memory line needs to be written to the next highest memory in the memory hierarchy, e.g., main memory 16. In other words, a cache memory line is fully dirty when the entire cache memory line has been written such that the next highest memory in the memory hierarchy is not up to date. Each cache memory line may use a 1-bit "Fully Dirty" flag to indicate if a particular cache memory line is fully dirty. Accordingly, for a fully dirty cache memory line, its dirty mask can be available for re-allocation to indicate another cache memory line that is not fully written. The fully dirty status of the cache memory line may be indicated by the fully dirty flag. As such, the dirty mask is no longer needed for that cache memory line because, for a fully dirty cache memory line, every byte in that cache memory line is dirty. A mask is not necessary to keep track of the bytes that are dirty.

As illustrated in FIG. 3, a cache memory line may be configured to include a fully dirty flag 314 and a dirty buffer index 316. Dirty mask space 18 may be part of cache memory 14 or a separate memory device that may be allocated to a particular cache memory line 110 when a write to that cache memory line 110 is not a full write to that particular cache memory line. An identification (ID) of the allocated dirty mask space is attached to the particular cache memory line 110 such that the dirty mask space 18 may be accessed.

Figure 4A:
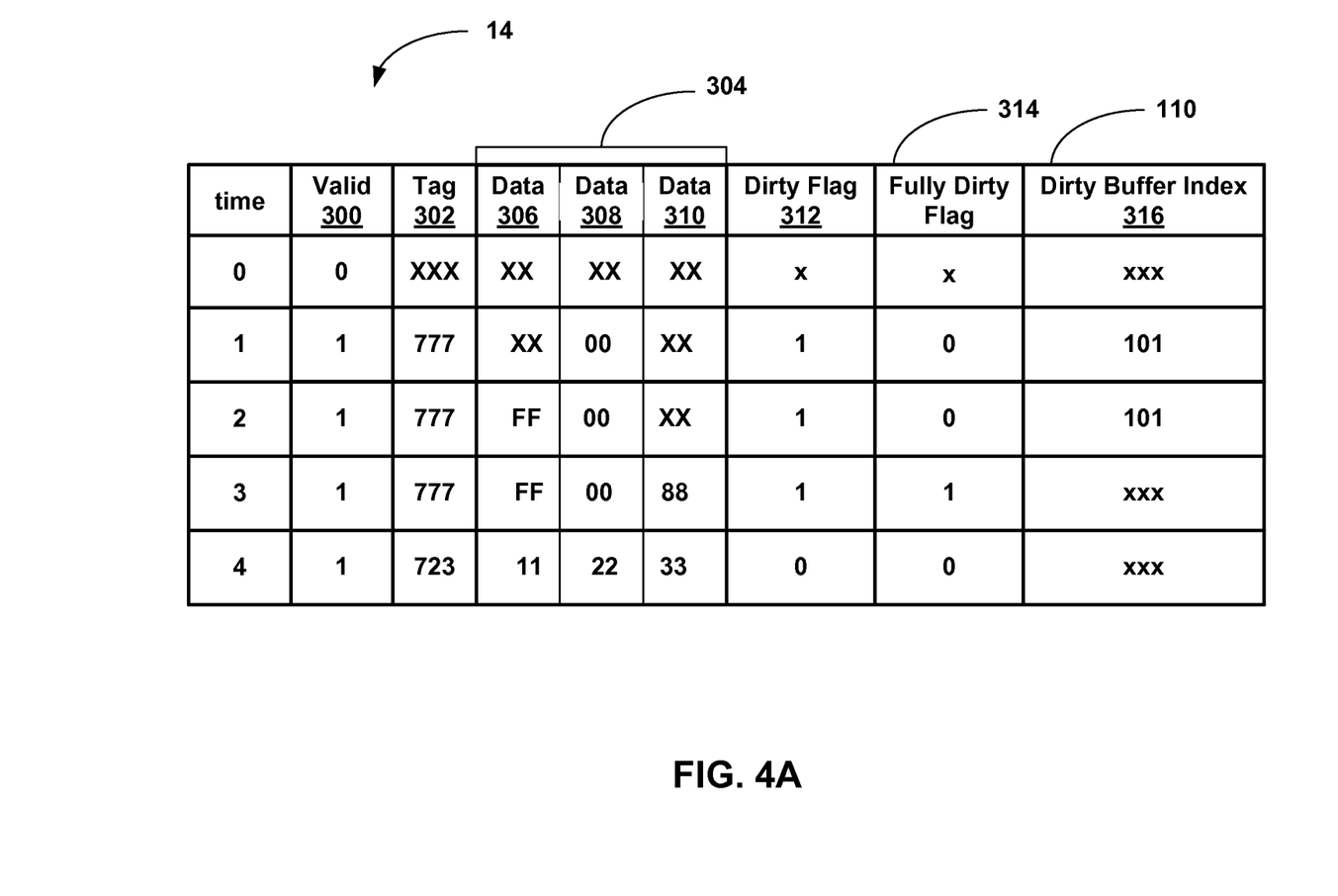
FIG. 4A is a conceptual diagram illustrating values in a cache memory line over time.
Figure 4B:
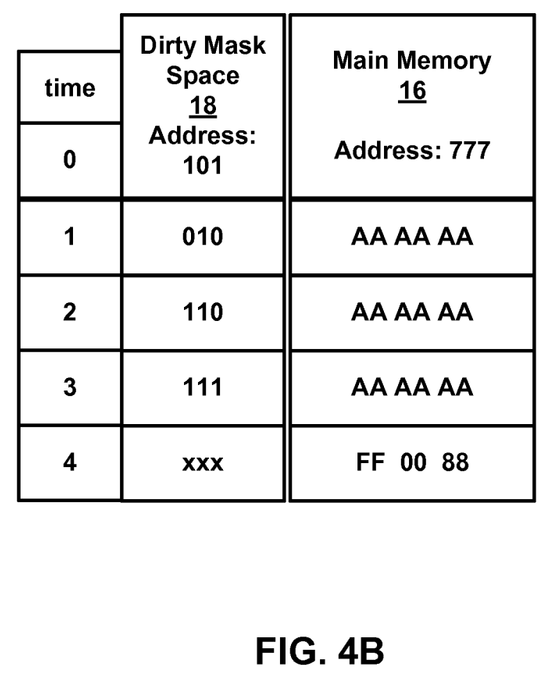
FIG. 4B is a conceptual diagram illustrating values for a single address in dirty mask space and a single address in main memory over time.

FIGS. 4A and 4B are conceptual diagrams illustrating an example of data processing in a cache memory 14 using the techniques of this disclosure. FIG. 4A illustrates values in a single cache memory line 110 over the course of five different points in time. Time 0 indicates an initial state. Times 1 to 3 illustrate various data writes to cache memory line 110. The proposed scheme may save system memory read bandwidth when compared to, for example, a read-allocate-write scheme. Time 4 illustrates a read from address 723 and an eviction of cache line 777 such that information about cache memory line 777 is no longer stored in a dirty byte mask because the cache memory line has become fully dirty and there is no need to track which bytes are dirty because each byte is dirty. Values for a single address in dirty mask space 18 and a single address in main memory 16 and how these values change at the five different points in time is illustrated in FIG. 4B.

As discussed, five different times are illustrated. These five different points in time are time 0 through time 4. Time 0 is an initial state. At time 0 data has not been written to the cache memory line 110. Generally, it may not be particularly important what the values of the various flags and data registers are at time 0.

Data may then be written from main memory 16 to cache memory line 110. In the illustrated example, when cache memory 14 receives a write request from processor 12, it does not know what the data in main memory 16 is and does not fetch the data at that time. Rather, data may be written to cache memory 14, one byte at a time, as it is needed by processor 12. If the data is never actually needed, it is not written to the cache memory 14. This may save the read bandwidth from main memory 16 to cache memory 14. This data may be stored in cache memory line 110 byte by byte as it is written at times 1, 2, and 3, and may be read or written over by processor 12. At times 1, 2, and 3, the data 304 (see FIG. 3) is modified in various ways, as is discussed in additional detail below. At time 4, data 304 is written from cache memory line 110 back to main memory 16 so that main memory 16 and cache memory line 110 again store the same data. At that time, cache memory line 110 may be evicted and data from address 723 may be read from main memory 16 and written to cache memory line 110. The data may be written to cache memory line 110 because it is needed by processor 12.

As illustrated in the example of FIG. 4A, at time 0 we generally "don't care" about any of the data in cache memory line 110. The values may be some initial state or garbage data from a previous write to cache memory line 110. "Don't care" is indicated by "X." The capital "X" indicates hexadecimal values (4 bits each) and the lower case "x" indicates individual bits. Accordingly, valid flag 300, dirty flag 312, and fully dirty flag 314 are individual bits in this example. In another example, it may be that the values stored at time 0 were known valid values, but are simply no longer needed for processing.

As illustrated in the example of FIG. 4A, tag 302 includes three hexadecimal values (12 bits total). Tag 302 indicates the address in main memory 16 that the data now stored in that cache memory line originated from. Dirty buffer index 316 includes three binary digits. The dirty buffer index 316 acts as a pointer to the mask that indicates which bytes are dirty.

The data 304 includes three bytes of data. Each data byte 306, 308, 310 is two hexadecimal digits. One byte is 8 bits and each hexadecimal digit represents 4 bits. Each address in dirty mask space 18 in the illustrated example includes three bits. Main memory 16 in the illustrated example includes six hexadecimal digits (24 bits total).

The illustrated example of FIG. 4A-4B is not a read-allocate-write scheme. Accordingly, because the initial data values are not needed by processor 12 in the example of FIG. 4A-4B, the figure does not illustrate data being written to cache memory 14. In a read-allocate-write example, valid data may be written to cache memory 14 from main memory 16, more specifically, data may be written to cache memory line 110 of cache memory 14. Accordingly, valid flag 300 is "1." Tag 302 would indicate that the address in main memory 16 that the data comes from is "777." In such an example, main memory 16, address 777 would include data "AA AA AA."

At time 1, data 304 is modified. More specifically, data byte 308 is changed from its previous value to "00." This may be done, for example, by processor 12 as part of a process the processor 12 is performing or by a direct memory transfer from main memory 16 to cache memory 14. Accordingly, the data 304 is "dirty" as indicated by dirty flag 312, which contains a value of "1." Only one of the three data bytes 306, 308, 310 are dirty; specifically, data byte 308 is dirty. Cache memory line 110 is not "fully dirty" and fully dirty flag 314 contains a value of "0." Because cache memory line 110 is "dirty," but not "fully dirty" (the second state discussed above) a dirty buffer mask is needed to determine which bytes of the byte writable cache memory 14 are dirty. For example, bits indicating the dirty bytes may be stored in dirty mask space 18. Dirty buffer index 316 contains a value of "101." This value is a pointer to an address in dirty mask space 18. Address "101" of dirty mask space 18 is illustrated in FIG. 4B and at time 1 address "101" (5) of dirty mask space 18 contains a binary value of "010." This indicates that data byte 308 is dirty, indicated by the "1" in "010." The first "0" in "010" indicates that data byte 306 is not dirty and the second "0" in "010" indicates that data byte 310 is not dirty. Accordingly, in the illustrated example of FIG. 4B, each bit in dirty mask space 18, address "101," may be used to track the dirty state of a specific data byte 306, 308, 310 of data 304.

As illustrated in FIG. 4A, at time 2, data 304 is modified. More specifically, data byte 306 is changed from its previous value to "FF." The data 304 is still "dirty" as indicated by dirty flag 312, which contains a value of "1." Only two of the three data bytes 306, 308, 310 are dirty, specifically, data bytes 306 and 308 are dirty. Cache memory line 110 is not "fully dirty" and fully dirty flag 314 contains a value of "0." Because cache memory line 110 is "dirty," but not "fully dirty," (again, the second state discussed above) the dirty buffer mask is needed to determine which bytes of the byte writable cache memory 14 are dirty. For example, bits indicating the dirty bytes may be stored in dirty mask space 18. Dirty buffer index 316 contains a value of "101." This value is a pointer to an address in dirty mask space 18. Address "101" of dirty mask space 18 is illustrated in FIG. 4B and at time 2 address "101" of dirty mask space 18 contains a value of "110," binary. This indicates that data bytes 306 and 308 are dirty, indicated by the "1's" in "110." The "0" in "110" indicates that data byte 310 is not dirty. In the illustrated example of FIG. 4B, each bit in dirty mask space 18, address "101," may be used to track the dirty state of a specific data byte 306, 308, 310 of data 304

As illustrated in FIG. 4A, at time 3, data 304 is again modified. More specifically, data byte 310 is changed from its previous value to "88." The data 304 is "dirty" as indicated by dirty flag 312, which contains a value of "1." At this time, however, all three of the three data bytes 306, 308, 310 are dirty. Cache memory line 110 is "fully dirty" at time 3. Accordingly, fully dirty flag 314 contains a value of "1." Because cache memory line 110 is "fully dirty," (the third state discussed above) a dirty buffer mask is not needed to determine which bytes of the byte writable cache memory 14 are dirty. All the bytes for the cache memory line 110 are dirty. The value in dirty buffer index 316 at time 3 is a "don't care," i.e. "xxx." Additionally, the value of dirty mask space 18, address 101 is a "don't care," i.e. "xxx." This mask space may be re-allocated to another cache memory line 110, 112, 114, 116, 118, 120, 122 to track dirty byte status.

At time 4, data 304 is written back to main memory 16, address 777. Accordingly, at time 4, the data in main memory 16, address 777 is "FF 00 88." At time 4, cache memory line 110 is in the first state described above, "not dirty." In the not dirty state, the dirty buffer mask stored in dirty mask space 18 is not needed because none of the bits is dirty. As illustrated in FIG. 4A, dirty flag 312 contains a value of "0" at time 4 and fully dirty flag 314 also contains a value of "0" at time 4. In other words, information about cache memory line 110 is no longer stored in a dirty byte mask because the cache memory line has become fully dirty and there is no need to track which bytes are dirty because each byte is dirty. At time 4, cache memory line 110 may store information, for example, related to another main memory 16 address, e.g., address 723.

In an example, as described above, if a write request does not write to the full cache memory line, a dirty mask space may be allocated to it. The identification (ID) of the allocated dirty mask space may be attached to this cache memory line, so that the mask can be accessed when this cache memory line is evicted.

In one example, a dirty mask may be used to track a specific data byte of multiple data bytes. A specific bit within the mask may be used to mark if the data byte has been changed through a write such that that byte no longer matches the value of a corresponding byte in, for example, main memory.

In an example, using bits within the mask to individually mark each one of the multiple data bytes allows for the tracking of which have been updated through at least one write. In an example, a specific dirty bit may be used to indicate that a specific byte is dirty. A determination may be made that each one of the multiple data bytes has been updated by determining if each bit in the mask is active.

Using a dirty mask allows for determining if a data element has been updated or not. For example, specific logic circuitry may be provided to verify that all dirty bits in a dirty mask are marked dirty, e.g., by carrying out a Boolean 'and' operation on all the dirty bits. At this point, the data element set may be marked as a write-back candidate.

Any write requests that hit the cache memory lines attached with a dirty mask should cause an update to the corresponding dirty mask. When the dirty mask is updated, detection logic may detect if the dirty mask is all 1's. Once the dirty mask is all 1's, indicating that the bytes in the particular cache line are fully dirty, it can be de-attached from the cache memory line by setting the ID to invalid. This indicates that the cache memory line is "fully dirty." A cache memory line is fully dirty when the entire cache memory lines needs to be written to the next highest memory in the memory hierarchy. In other words, a cache memory line is fully dirty when the entire cache memory line has been written such that the next highest memory in the memory hierarchy is not up to date. Each cache memory line may use a 1-bit "Full" flag to indicate if a particular cache memory line is fully dirty. Accordingly, for a fully dirty cache memory line, its dirty mask can be available for re-allocation to indicate another cache memory line that is not fully written. The fully dirty status of the cache memory line may be indicated by the fully dirty flag. As such, the dirty mask is no longer needed for that cache memory line.

Figure 5:
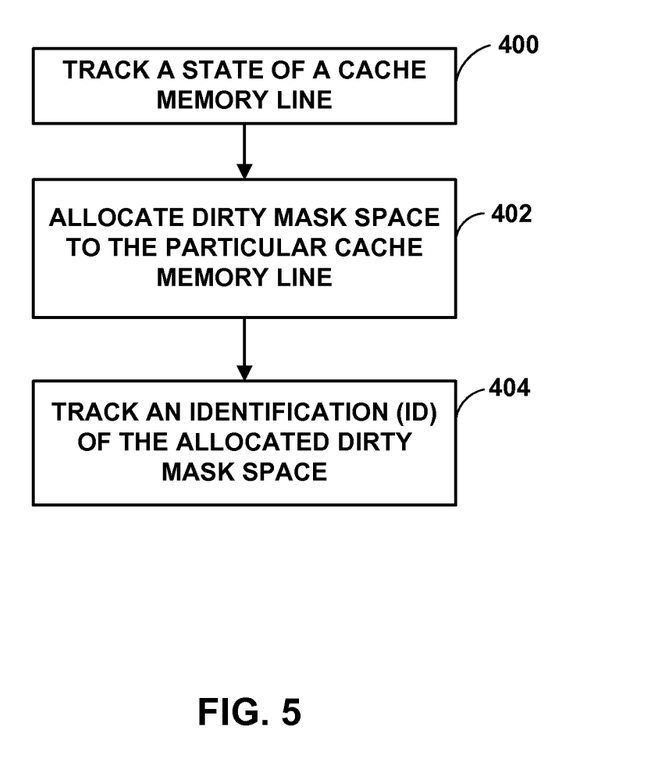
FIG. 5 is a flowchart illustrating an example method in accordance with the techniques of this disclosure.

FIG. 5 is a flowchart illustrating an example method in accordance with the techniques of this disclosure. A cache memory 14 may track a state of a cache memory line in a cache memory (400). For example, a cache controller 20 may track a state of a cache memory line in cache memory 14. This may be done, for example, using a dirty flag that indicates when a write to the cache memory line is not a full write to every byte in that particular cache memory line. Accordingly, when a write to a cache memory line occurs and the write is not a full write to every byte in that particular cache memory line, some of the bytes in the cache memory line may be different from the corresponding memory location(s) in main memory 16. Additionally, some of the bytes in the cache memory line may be the same as the corresponding memory location(s) in main memory 16. It will be understood, however, that as subsequent writes to the same cache memory line occur, eventually the entire cache memory line may be different from the corresponding memory location(s) in main memory 16. As discussed above, the write or writes that may occur after the last memory transfer will generally change the data stored in the cache from what is stored in the corresponding memory location. Nevertheless, it is possible that processor 12 will write the same values into cache memory so that the data does not actually change after a write or writes occur. The system generally does not actually check the data to be sure it has been changed. Rather, the system just assumes as much and marks the appropriate dirty flag based on what was written, e.g., dirty or fully dirty. For example, a write to the entire cache memory line may occur or multiple writes to the cache memory line may eventually change each byte in the cache memory line.

The cache memory may allocate dirty mask space 18 to the particular cache memory line when a write to that cache memory line is not a full write to that particular cache memory line (402). For example, cache controller 20 may perform the allocation. It will be understood that cache controller 20 may be part of cache memory 14, or separate from cache memory 14. Accordingly, dirty masks within dirty mask space 18 may be allocated to, and de-allocated from, cache memory lines as needed. Using dirty mask space 18 rather than dirty mask space for each cache line may require less memory.

The cache memory may track an identification (ID) of the allocated dirty mask space that is attached to the particular cache memory line such that the dirty mask space may be accessed (404). For example, cache controller 20 may track an ID. Thus the ID may provide a connection between the cache memory line and the allocated dirty mask space, e.g., the dirty mask, such that the dirty mask may be used to determine which bytes in the cache memory line are dirty and potentially do not include the same data as the corresponding bytes in the main memory 16.

In some examples, if all dirty masks in the dirty mask space 18 become allocated to a cache memory line and an additional dirty mask is needed, one may be de-allocated, for example, prior to the corresponding cache memory line becoming fully dirty (each byte being different from the corresponding byte in main memory 16). If this occurs, a dirty mask in the dirty mask space 18 may be selected to be de-allocated from a particular cache memory line and the data in the cache memory line may be written back to the corresponding memory in the main memory 16 such that the cache memory line is no longer dirty.

Some examples of the systems and methods described herein may cause an update to a corresponding dirty mask in the dirty mask space when a write request to one of a series of cache memory lines that includes the dirty mask occurs. Additionally, the cache may attach the ID of the allocated dirty mask space to the particular cache memory line such that the dirty mask space may be accessed when this cache memory line is evicted. The cache may also indicate the particular cache memory line to which a dirty buffer mask is allocated in some examples. The cache may also indicate that at least one byte of the cache memory line is different from a corresponding byte in a main memory.

Various examples described herein may indicate that the cache memory 14 may perform various actions. It will be understood, that in some examples, a processor, controller, or other logic circuitry inside cache memory 14 may perform these actions. Other examples may include a processor, controller, or other logic circuitry that is not inside cache memory 14, but controls one or more of the functions described herein. Accordingly, the dynamically allocated dirty mask space functionality may be performed internal to the cache memory, external to the cache memory, or in some combination of these. It may be performed by hardware circuitry, software, or some combination of these.

Figure 6:
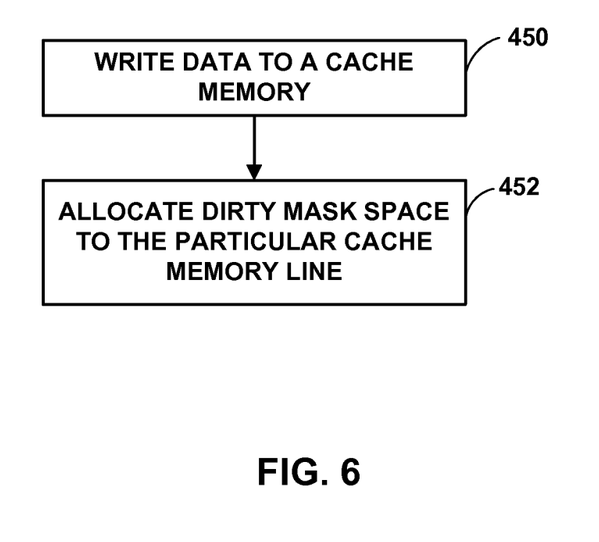
FIG. 6 is another flowchart illustrating an example method in accordance with the techniques of this disclosure.

FIG. 6 is another flowchart illustrating an example method in accordance with the techniques of this disclosure. An example system, device, or apparatus may write data to a cache memory that include a series of cache memory lines (450). Each cache memory line may include a fully dirty flag and a dirty buffer index. The fully dirty flag indicates that the cache memory line is "fully dirty," in other words, that each byte in the cache memory line is different from the corresponding byte in main memory 16.

The dirty buffer index may include an address or index to a dirty buffer. For example, the dirty buffer index may include at least one pointer to at least one location to which at least one of the dirty masks is allocated. In another example, the dirty buffer index includes a pointer to a location to which one of the plurality of dirty masks is allocated. The dirty buffer indicates bytes that are different from corresponding bytes in main memory 16.

An example system, device, or apparatus may allocate the dirty mask space in the dirty buffer to a particular cache memory line when a write to that cache memory line is not a full write to that particular cache memory line (452). For example, cache controller 20 within an example system, device, or apparatus may perform such an allocation. In some examples, cache controller 20 may be part of cache memory 14. In other examples, it may be a separate device. Additionally, an identification (ID) of the allocated dirty mask space is attached to the particular cache memory line such that the dirty mask space may be accessed.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on, or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, electrically erasable programmable read only memory (EEPROM), compact disc-read only memory (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec (coder-decoder) hardware unit or provided by a collection of interoperative hardware units, including one or more processors as described above, in conjunction with suitable software and/or firmware.

Various examples have been described. These and other examples are within the scope of the following claims.

What is claimed is:

1. A cache memory system comprising:
a cache memory including a plurality of cache memory lines;
a dirty buffer including a plurality of dirty masks; and
a cache controller configured to:
allocate one of the plurality of dirty masks to a respective cache memory line when a write to the respective cache memory line is not a full write, wherein the one of the plurality of dirty masks indicates dirty states of data units in the respective cache memory line,
store identification (ID) information that associates the one of the plurality of dirty masks with the respective cache memory line to which the one of the plurality of dirty masks is allocated,
de-allocate the one of the plurality of dirty masks from the respective cache memory line when each of the data units in the respective cache memory line is dirty, and
de-allocate the one of the plurality of dirty masks from the respective cache memory line when each of the data units in the respective cache memory line is not dirty.

2. The cache memory system of claim 1, wherein each of the plurality of cache memory lines includes:
a location storing a fully dirty flag indicating when each of the data units in the respective cache memory line is dirty; and
a location storing a dirty buffer index for storing the ID information.

3. The cache memory system of claim 2, wherein each of the plurality of cache memory lines further includes:
a location storing a dirty flag that indicates that at least one data unit of the respective cache memory line has been written since a last write of data from a main memory.

4. The cache memory system of claim 3, wherein the dirty flag that indicates that at least one data unit of the respective cache memory line has been written since the last write of data from the main memory comprises a 1-bit flag.

5. The cache memory system of claim 2, wherein the fully dirty flag comprises a 1-bit flag.

6. The cache memory system of claim 2, wherein the dirty buffer index provides an address for a dirty mask that indicates the respective cache memory line to which the dirty mask is allocated.

7. The cache memory system of claim 2, wherein the dirty buffer index comprises a pointer to a location of a dirty mask in the dirty buffer.

8. The cache memory system of claim 1, wherein the cache controller is further configured to cause an update to the one of the plurality of dirty masks allocated to the respective cache memory line when a write request to the respective cache memory line occurs.

9. The cache memory system of claim 1, wherein the dirty buffer comprises a portion of the cache memory.

10. The cache memory system of claim 1, wherein the dirty buffer comprises a separate memory from the cache memory.

11. The cache memory system of claim 1, further comprising a processor coupled to the cache memory and a main memory coupled to the processor, the processor configured to read and write data to the cache memory and the main memory.

12. A method of operating a memory system comprising:
writing data to a cache memory including a plurality of cache memory lines;
allocating one of a plurality of dirty masks to a respective cache memory line of the plurality of cache memory lines when a write to the respective cache memory line is not a full write, wherein the one of the plurality of dirty masks indicates a dirty state of data units in the respective cache memory line;
de-allocating the one of the plurality of dirty masks from the respective cache memory line when each of the data units in the respective cache memory line is dirty;
de-allocating the one of the plurality of dirty masks from the respective cache memory line when each of the data units in the respective cache memory line is not dirty; and
storing identification (ID) information that associates the one of the plurality of dirty masks with the respective cache memory line to which the one of the plurality of dirty masks is allocated.

13. The method of claim 12, wherein each of the plurality of cache memory lines includes:
a location storing a fully dirty flag indicating when each of the data units in the respective cache memory line is dirty; and
a location storing a dirty buffer index for storing the ID information.

14. The method of claim 12, further comprising causing an update to the one of the plurality of dirty masks when a write request to the respective cache memory line that includes the one of the plurality of dirty masks occurs.

15. The method of claim 12, further comprising indicating that at least one data unit of the respective cache memory line has been written since a last write of data from a main memory.

16. The method of claim 12, further comprising indicating that the respective cache memory line is fully dirty.

17. The method of claim 12, further comprising indicating the respective cache memory line to which the one of the plurality of dirty masks is allocated.

18. A system comprising:
a processor;
a main memory coupled to the processor;
a cache memory, coupled to the processor, the cache memory including:
a cache controller;
a plurality of cache memory lines; and
a dirty buffer including a plurality of dirty masks,
wherein the cache controller is configured to allocate the one of the plurality of dirty masks to a respective cache memory line of the plurality of cache memory lines when a write to the respective cache memory line is not a full write, wherein the one of the plurality of dirty masks indicates a dirty state of data units in the respective cache memory line,
wherein the cache controller is configured to de-allocate the one of the plurality of dirty masks from the respective cache memory line when each of the data units in the respective cache memory line is dirty,
wherein the cache controller is configured to de-allocate the one of the plurality of dirty masks from the respective cache memory line when each of the data units in the respective cache memory line is not dirty, and
wherein the cache controller is configured to store an identification (ID) information that associates the one of the plurality of dirty masks with the respective cache memory line to which the one of the plurality of dirty masks is allocated.

19. The system of claim 18, wherein each of the cache memory lines includes:
   a location storing a fully dirty flag indicating when each of the data units in the respective cache memory line is dirty; and
   a location storing a dirty buffer index for storing the ID information.

20. The system of claim 19, wherein each of the cache memory lines further includes a location storing a dirty flag that indicates that at least one data unit of the respective cache memory line is different from a corresponding data unit in the main memory.

21. The system of claim 19, wherein the dirty buffer index that provides an address for the one of the plurality of dirty masks that indicates the respective cache memory line to which the one of the plurality of dirty masks is allocated.

22. The system of claim 18, wherein the cache controller is further configured to cause an update to the one of the plurality of dirty masks when a write request to the respective cache memory line that includes the one of the plurality of dirty masks occurs.

23. The system of claim 18, wherein the cache controller is configured to store the ID information for the respective cache memory line in a location in the respective cache memory line.

24. The system of claim 18, wherein the dirty buffer comprises a portion of the cache memory.

25. The system of claim 18, wherein the dirty buffer comprises a separate memory from the cache memory.

* * * * *